(12) United States Patent
Hwang et al.

(10) Patent No.: US 8,522,108 B2
(45) Date of Patent: Aug. 27, 2013

(54) OPTICAL RECORDING MEDIUM, APPARATUS AND METHOD OF RECORDING/REPRODUCING DATA THEREON/THEREFROM, AND COMPUTER-READABLE RECORDING MEDIUM STORING PROGRAM TO PERFORM THE METHOD

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 13/104,839

(22) Filed: May 10, 2011

(65) Prior Publication Data
US 2011/0214140 A1 Sep. 1, 2011

Related U.S. Application Data

(62) Division of application No. 12/107,370, filed on Apr. 22, 2008, now Pat. No. 7,945,837, which is a division of application No. 11/088,937, filed on Mar. 25, 2005, now Pat. No. 7,539,919.

(30) Foreign Application Priority Data

May 22, 2004 (KR) .................................. 2004-36642

(51) Int. Cl.
*H03M 13/00* (2006.01)
(52) U.S. Cl.
USPC .................... 714/752; 714/769; 369/59.25

(58) Field of Classification Search
USPC ................ 714/701, 756, 761–763, 769, 787, 714/788; 369/59.25
See application file for complete search history.

(56) References Cited

U.S. PATENT DOCUMENTS

| | | | |
|---|---|---|---|
| 5,720,030 A | 2/1998 | Kamihara et al. |
| 6,189,118 B1 | 2/2001 | Sasaki et al. |
| 6,198,783 B1 | 3/2001 | Campana, Jr. |
| 6,204,984 B1 | 3/2001 | Uno et al. |
| 6,356,611 B1 | 3/2002 | Chapel et al. |
| 6,367,049 B1 | 4/2002 | Van Dijk et al. |

(Continued)

FOREIGN PATENT DOCUMENTS

| | | |
|---|---|---|
| EP | 0 997 904 A1 | 5/2000 |
| EP | 0 866 456 B1 | 5/2002 |

(Continued)

OTHER PUBLICATIONS

Japanese Office Action issued on Aug. 30, 2011, in counterpart Japanese Application No. 2011-049477 (1 page, in Japanese, no English translation).

(Continued)

*Primary Examiner* — Guy Lamarre
(74) *Attorney, Agent, or Firm* — NSIP Law

(57) ABSTRACT

A recording medium on which a recording/reproducing unit block is recorded, an apparatus to record and/or reproduce data on/from the recording medium, and a method of recording/reproducing the data on/from the recording medium. The recording/reproducing unit block comprises invalid data used in disc certification, and an identifier to indicate that the invalid data is included in the recording/reproducing unit block, the invalid data being used during the disc certification on a portion of the recording medium or the entire recording medium.

7 Claims, 9 Drawing Sheets

(56) References Cited

U.S. PATENT DOCUMENTS

| | | |
|---|---|---|
| 6,418,100 B1 | 7/2002 | Park et al. |
| 6,549,921 B1 * | 4/2003 | Ofek ............................ 714/13 |
| 6,611,483 B1 | 8/2003 | Park et al. |
| 7,539,919 B2 | 5/2009 | Hwang et al. |
| 7,823,042 B2 | 10/2010 | Hwang et al. |
| 7,945,837 B2 | 5/2011 | Hwang et al. |
| 2002/0067674 A1 | 6/2002 | Schneck et al. |
| 2004/0003172 A1 | 1/2004 | Su et al. |
| 2004/0201473 A1 | 10/2004 | Lee |
| 2004/0246838 A1 | 12/2004 | Hwang et al. |
| 2005/0013154 A1 * | 1/2005 | Honda et al. .................. 365/145 |
| 2005/0083740 A1 | 4/2005 | Kobayashi |
| 2008/0192602 A1 | 8/2008 | Hwang et al. |

FOREIGN PATENT DOCUMENTS

| | | |
|---|---|---|
| EP | 1 391 892 A1 | 2/2004 |
| EP | 1 418 583 A2 | 5/2004 |
| EP | 1 513 150 A1 | 3/2005 |
| EP | 1 566 807 A2 | 8/2005 |
| FR | 2 761 494 A1 | 10/1998 |
| JP | 61-63968 A | 4/1986 |
| JP | 10-106170 A | 4/1998 |
| JP | 11-134811 A | 5/1999 |
| JP | 2001-357628 A | 12/2001 |
| JP | 2002-117660 A | 4/2002 |
| JP | 2002-521789 A | 7/2002 |
| JP | 2002-279646 A | 9/2002 |
| JP | 2004-14088 A | 1/2004 |
| JP | 2005-339772 A | 12/2005 |
| KR | 2001-0046919 A | 6/2001 |
| KR | 2003-0033127 A | 5/2003 |
| KR | 10-2004-0011073 A | 2/2004 |
| SG | 114695 | 6/2007 |
| TW | I254280 B | 5/2006 |
| WO | WO 00/07300 A1 | 2/2000 |
| WO | WO 03/105150 A1 | 12/2003 |
| WO | WO 2004/105024 A1 | 12/2004 |

OTHER PUBLICATIONS

Japanese Office Action issued on Aug. 30, 2011, in counterpart Japanese Application No. 2011-049478 (1 page, in Japanese, no English translation).

Korean Office Action issued on Dec. 15, 2005, in counterpart Korean Application No. 10-2004-0036642 (4 pages, in Korean, including complete English translation).

European Search Report issued on Dec. 28, 2005, in counterpart European Application No. 05252929.4 (3 pages).

Singapore Office Action issued on Mar. 7, 2006, in counterpart Singapore Application No. 200502647-5 including Search Report and Written Opinion issued on Jan. 12, 2006, by the Australian Patent Office acting as Singapore local search and examination authority (6 pages, in English).

Taiwan Office Action issued on Jul. 24, 2008, in counterpart Taiwan Application No. 094111292 (23 pages, in Chinese, including complete English translation).

Singapore Office Action issued on May 12, 2009, in counterpart Singapore Application No. 200702389-8 including Written Opinion issued on Apr. 8, 2009, by the Australian Patent Office acting as Singapore local examination authority (8 pages, in English).

Canadian Office Action issued on Sep. 22, 2009, in counterpart Canadian Application No. 2,503,612 (3 pages).

Japanese Office Action issued on Dec. 3, 2010, in counterpart Japanese Application No. 2005-142936 (6 pages, in Japanese, including complete English translation).

U.S. Appl. No. 12/107,337, filed Apr. 22, 2008, Sung-hee Hwang et al., Samsung Electronics Co., Ltd.

U.S. Appl. No. 12/107,361, filed Apr. 22, 2008, Sung-hee Hwang et al., Samsung Electronics Co., Ltd.

* cited by examiner form a data block 12 arranged in 304 columns and 216 rows. Next, a long distance (LDS) block 13 is formed by adding 32 parity rows to the data block 12. Then, the LDS block 13 is arranged in 152 columns and 496 rows, forming an error correcting code (ECC) cluster 14. The ECC cluster 14 is dispersed to fill sections of a physical cluster block 20 labeled ECC.

OPTICAL RECORDING MEDIUM, APPARATUS AND METHOD OF RECORDING/REPRODUCING DATA THEREON/THEREFROM, AND COMPUTER-READABLE RECORDING MEDIUM STORING PROGRAM TO PERFORM THE METHOD

CROSS-REFERENCE TO RELATED APPLICATIONS

This application is a division of application Ser. No. 12/107,370 filed on Apr. 22, 2008, now U.S. Pat. No. 7,945,837, which is a division of application Ser. No. 11/088,937 filed on Mar. 25, 2005, now U.S. Pat. No. 7,539,919, and claims the benefit of Korean Patent Application No. 2004-36642 filed on May 22, 2004, in the Korean Intellectual Property Office, the disclosures of which are incorporated herein by reference in their entirety.

BACKGROUND OF THE INVENTION

1. Field of the Invention

The present invention relates to a disc, and, more particularly, to an optical recording medium, an apparatus and a method of recording/reproducing data thereon/therefrom, and a computer-readable recording medium storing a program to perform the method.

2. Description of the Related Art

Recording data on, or reproducing data from, an information storage medium such as a hard disc (HD), a compact disc (CD), or a digital versatile disc (DVD) is performed in regular units. The units are recording unit blocks or reproducing unit blocks. An example of the recording unit block or the reproducing unit block is an error correction block to correct an error generated when recording or reproducing data.

When only 4 Kbytes of a 64 Kbytes error correction block are recorded, the rest of the error correction block, that is, the remaining 60 Kbytes, is filled with invalid values such as 00h.

When a disc drive reads the error correction block with only a portion of the block having valid data, and then performs error correction to reproduce the error correction block, the entire error correction block is determined to be uncorrectable because code words including the 60 Kbytes of invalid data cannot be corrected, even though code words including the 4 Kbytes of valid data can be corrected. The disc drive cannot distinguish which part of the error correction block is filled with valid data and which part of the error correction block is filled with invalid data. Therefore, the disc drive performs error correction or reproduction again, or erroneously finalizes the error correction block, even if a part of the error correction block has valid data. This situation occurs not only when reproducing data but also when updating data or adding data.

U.S. Pat. No. 6,367,049 (hereinafter referred to as "interleaving encoding") discloses a method of encoding data using an interleaving method. The "interleaving encoding" interleavingly arranges an "LDS block," including user data, and a "BIS block," including address data, in a physical cluster and then records them. When reproducing data, the "BIS block" is error corrected first, and then the "LDS block" is error corrected. Referring to FIG. 1, the "interleaving encoding" will be briefly described.

FIG. 1 is a schematic representation of a conventional method of interleaving encoding.

Referring to FIG. 1, user data 11 received from a source (not shown) such as a host or an application is divided into data frames each having 2048+4 bytes. The user data 11 forms a data block 12 arranged in 304 columns and 216 rows. Next, a long distance (LDS) block 13 is formed by adding 32 parity rows to the data block 12. Then, the LDS block 13 is arranged in 152 columns and 496 rows, forming an error correcting code (ECC) cluster 14. The ECC cluster 14 is dispersed to fill sections of a physical cluster block 20 labeled ECC.

Logical address and control data 15 combined by a recording system is arranged in 32*18 bytes. A physical address 16, related to a physical location of data on a medium, is arranged in 16*9 bytes. The logical address and control data 15 and the physical address 16 are combined to form an access block 17 with 24 columns*30 rows. Next, 32 parity rows are added to the access block 17 to form a burst indicator subcode (BIS) block 18. The BIS block 18 is arranged in a BIS cluster 19 having 3 columns and 496 rows. The BIS cluster 19 is dispersed to fill sections of the physical cluster block 20 labeled BIS. A synchronizing bit group of one column is added to the physical cluster block 20, thereby forming 155 columns*496 rows of the physical cluster block 20. By arranging data by interleaving, error correction ability is improved.

When recording data on a disc that is a recordable information storage medium, a drive system records data in cluster units, which are recording units. When a cluster is formed in, for example, 32 sectors, the drive system pads some invalid sectors, makes the number of the sectors a multiple of the cluster to match the number of the sectors of the cluster if the size of the sector that needs to be recorded is not a multiple of 32, and then records the data.

Also, even when adding data or updating data to an already recorded cluster when recording a portion of a sector (e.g., 16 sectors), and not a unit of a cluster (i.e., 32 sectors), the drive system reads a cluster comprising 32 sectors, including the 16 sectors in which data is to be added or updated from a disc 21, and stores the cluster in an internal memory. Then, after the cluster is error corrected, the 16 sectors in which data is to be added or updated are modified to a corresponding location in the internal memory, encoded together with the rest of the 16 sectors into one ECC cluster, and written on the disc 21. This process is called "read-modify-write," and is illustrated in FIG. 2. Of course, data will be recorded on the same physical address if the cluster does not have a defect, but data will be recorded on an alternative cluster according to a configured defect management method if the cluster has a defect when reproducing the cluster in the recordable information storage medium. In a write-once recording medium, data will be written on an alternative cluster by a defect process due to the characteristics of the write-once recording medium on which data can be written only once.

An operation of adding data to or updating data in 16 sectors to an already recorded cluster in a data structure, as in the "interleaving encoding" method, will be described in more detail. When reading a disc in a read-modify-write process to add data to or update data in the 16 sectors, data of a recording/reproducing cluster unit is read from the disc and stored in an internal memory. Then, after error correcting a BIS cluster first, an LDS cluster for data of 32 sectors is error corrected. If the error correction of the LDS cluster is unsuccessful, the rest of the 16 recorded sectors besides the 16 sectors in which data is to be added or updated cannot be reproduced, and thus data that is to be added or updated cannot be recorded. This is because a complete error correction needs to be performed, since valid data may be in the rest of the 16 sectors besides the 16 sectors in which data is to be added or updated. Therefore, in this case, if the validity of the data of the rest of the 16 sectors is not known, the drive system accesses the cluster in the disc again and retries reproduction, or transmits an error message to a host if the cluster cannot be reproduced despite the retry. Consequently, in such situations, the drive system is needlessly operated.

In the above situation, if the drive system knows the validity of the data of the rest of the 16 sectors besides the 16 sectors in which data is to be added or updated, and that the data is invalid, the drive system can add new data to or update the data in the 16 sectors in which data is to be added or updated without having the drive system unnecessarily retry reproduction or transmit an error message to the host. However, the validity of the rest of the 16 sectors cannot be known, and thus there is a high possibility for the drive system to error process the rest of the 16 sectors. As a result, error-correcting capability decreases.

Meanwhile, the drive system performs disc certification to examine whether the disc has a defect. The disc certification is to examine whether there is a defect in a cluster by the drive system padding an entire cluster by a predetermined value (00h or FFh) known to the drive system, recording a location of a cluster that is to be certified, and then reproducing the cluster. This is to learn a defect status of an entire disc at the initialization of the disc to use the disc, to re-learn a defect status of the entire disc at a re-initialization of the disc to use the disc from the start while using the disc, or to learn a defect status of a particular area while using the disc when needed. In addition, the drive system updates defect information of the cluster by reflecting the results of the certification.

FIG. 3 illustrates a conventional method of disc certification.

Referring to FIG. 3, when a disc 30 comprising a lead-in area 31, a data area 32, and a lead-out area 33 is certified, the entire data area 32 of the disc 30 is filled with, for example, "0."

After certifying the disc 30 to detect a defect status of a portion of the disc 30 or the entire disc 30, the drive system knows that an area that is certified is an already written area by an RF signal when trying to write data in the area that is certified, since at least the area that is certified is an already written area. Therefore, when adding or updating 16 sectors, which are a part of a cluster comprising 32 sectors, to an already written cluster, a read-modify-write process is needed. In the read-modify-write process, when reading the disc 30, the drive system reads data in the recording/reproducing unit cluster and stores the data in the internal memory, and after error correcting the BIS cluster first, the LDS cluster is error corrected. If the LDS cluster cannot be error corrected, the rest of the 16 sectors apart from the 16 sectors to be added or updated cannot be reproduced, and so the data that is to be added or updated cannot be written. Therefore, the drive system re-accesses the cluster in the disc 30 and retries reproduction, or transmits an error message to the host if the cluster cannot be reproduced even after the second try.

SUMMARY OF THE INVENTION

The present invention provides an optical recording medium, an apparatus and a method of recording/reproducing the medium, and a computer-readable recording medium storing a program to perform the method, by which an unnecessary operation of a drive system is prevented by checking whether invalid data exists in a recording unit block recorded by a disc certification, and error correction capability is improved.

Additional aspects and/or advantages of the invention will be set forth in part in the description which follows and, in part, will be obvious from the description, or may be learned by practice of the invention.

According to an aspect of the present invention, there is provided an optical recording medium on which a recording/reproducing unit block is recorded. The recording/reproducing unit block includes invalid data used in disc certification, and a padding identifier to indicate that the invalid data is included in the recording/reproducing unit block, the invalid data being used during the disc certification on a portion of the optical recording medium or the entire optical recording medium.

The recording/reproducing unit block may comprise a data block including the invalid data and an access block to access the data block. The access block may include address information of the invalid data in the data block and the padding identifier.

The recording/reproducing unit block may be a physical cluster comprising a long distance (LDS) cluster and a burst indicator subcode (BIS) cluster. The BIS cluster may include address information of data in the LDS cluster, and a dummy byte which has the padding identifier.

The padding identifier may indicate padding information for one or two sectors, or for one cluster.

According to another aspect of the present invention, there is provided a method of recording/reproducing data, the method including: recording a recording/reproducing unit block on a recording medium, the recording/reproducing unit block comprising invalid data used in disc certification and a padding identifier to indicate that the invalid data is included in the recording/reproducing unit block, the invalid data being used during the disc certification on a portion of the recording medium or the entire recording medium.

The method may further include: performing disc certification by reproducing the recording/reproducing unit block recorded on the recording medium; and recording defect information of the recording/reproducing unit block on the recording medium based on a result of the disc certification.

The method may further include: recording data in the recording/reproducing unit block regardless of error correction of previously recorded data of the recording/reproducing unit block based on the padding identifier that indicates the invalid data is included in the recording/reproducing unit block.

The method may further include: immediately recording data in the recording/reproducing unit block without a read-modify-write process in response to a data write command of the recording/reproducing unit block, registered in a defect block as the result of disc certification, being received.

According to another aspect of the present invention, there is provided a method of recording/reproducing data, the method including: generating an LDS cluster including invalid data used in disc certification of a recording medium; generating a BIS cluster by including a padding identifier, which indicates the LDS cluster is filled with the invalid data, in a physical address block; recording a physical cluster which combines the LDS cluster and the BIS cluster on the recording medium; performing disc certification by reproducing the physical cluster recorded on the recording medium; and recording a result of the disc certification as defect information on the recording medium.

According to another aspect of the present invention, there is provided an apparatus to record/reproduce data, the apparatus including: a reading/writing unit to read data from a recording medium and/or write data on the recording medium; and a controlling unit to control the reading/writing unit to write a recording/reproducing unit block on the recording medium, the recording/reproducing unit block including invalid data used in disc certification and a padding identifier to indicate that the invalid data is included in the recording/reproducing unit block, the invalid data being used during the disc certification on a portion of the recording medium or the entire recording medium.

According to another aspect of the present invention, there is provided an apparatus to record/reproduce data, the apparatus including: a reading/writing unit to read data from a recording medium and/or write data on the recording medium; and a controlling unit to generate a BIS cluster by including an LDS cluster, which has invalid data used in disc certification of the recording medium, and a padding identifier, which indicates that the LDS cluster is filled with the invalid data, in a physical address block, controls the reading/writing unit to write a physical cluster that combines the LDS cluster and the BIS cluster, performs disc certification by reproducing the physical cluster which is recorded on the recording medium, and controls the reading/writing unit to write a result of the disc certification as defect information on the recording medium.

According to another aspect of the present invention, there is provided a computer-readable recording medium having recorded thereon a method of recording/reproducing data. The method includes recording a recording/reproducing unit block on a recording medium, the recording/reproducing unit block comprising invalid data used in disc certification and a padding identifier to indicate that the invalid data is included in the recording/reproducing unit block, the invalid data being used during the disc certification on a portion of the recording medium or the entire recording medium.

According to another aspect of the present invention, there is provided a computer-readable recording medium having recorded thereon a method of recording/reproducing data. The method includes: generating an LDS cluster including invalid data used in disc certification of the computer-readable recording medium; generating a BIS cluster by including a padding identifier, which indicates the LDS cluster is filled with the invalid data, in a physical address block; recording a physical cluster which combines the LDS cluster and the BIS cluster on the computer-readable recording medium; performing disc certification by reproducing the physical cluster recorded on the computer-readable recording medium; and recording a result of the disc certification as defect information on the computer-readable recording medium.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
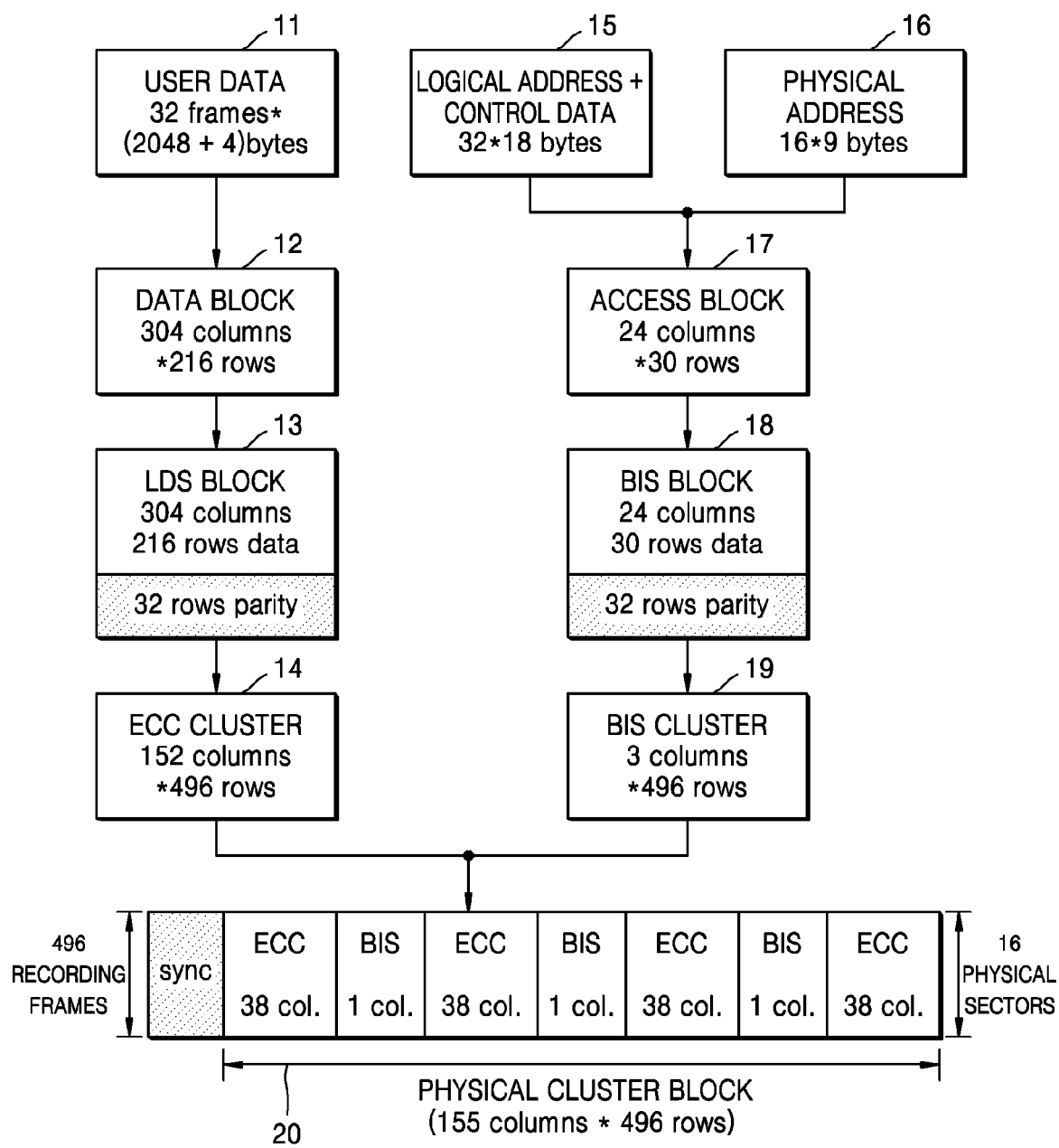
FIG. 1 is a schematic representation of a conventional method of interleaving encoding.
Figure 2:
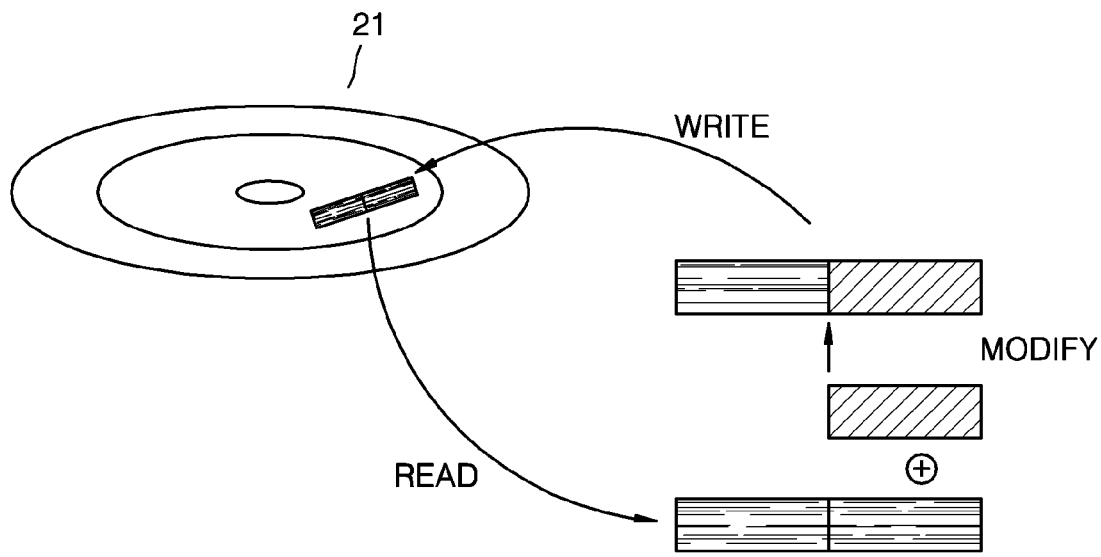
FIG. 2 illustrates a conventional "read-modify-write" method.
Figure 3:
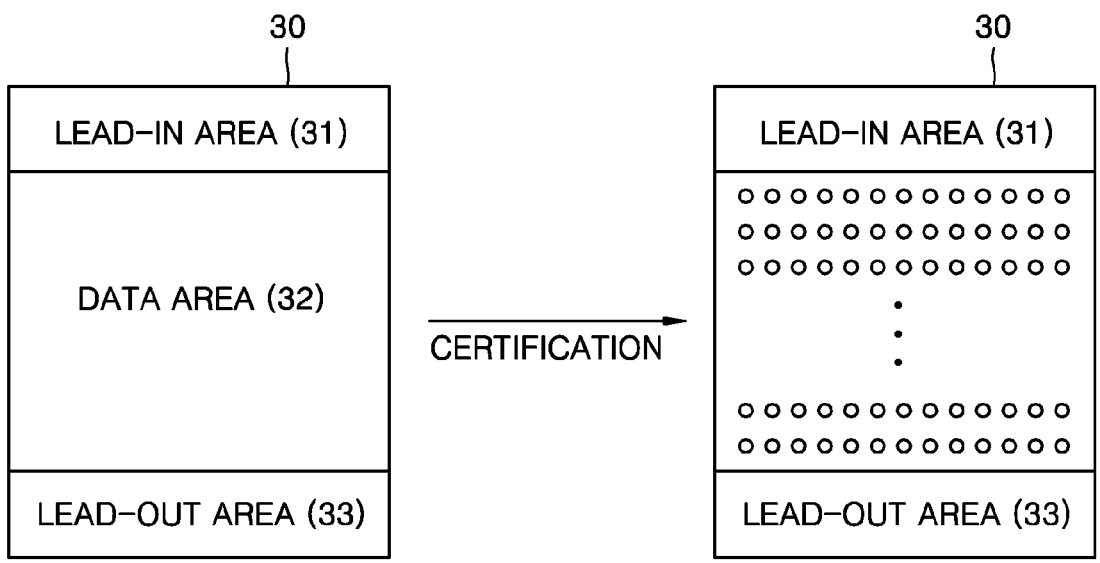
FIG. 3 illustrates a conventional method of disc certification.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

To solve the previously mentioned problem, and/or other possible problems, a padding identifier indicating that invalid data is included in a recording unit block is recorded in the recording unit block when recording the recording unit block in a disc for disc certification. By including the padding identifier in the recording unit block, data can be recorded through the read-modify-write process, even if the error correction of the recording unit block was unsuccessful, by checking the padding identifier in the recording unit block and determining whether invalid data is included in the recording unit block when recording data in the recording unit block. Although the recording unit block will be mainly described below, the same applies to a reproducing unit block.

First, a recording unit block in which a padding identifier, which is written on a disc, is inserted when performing disc certification will be described.

Figure 4:
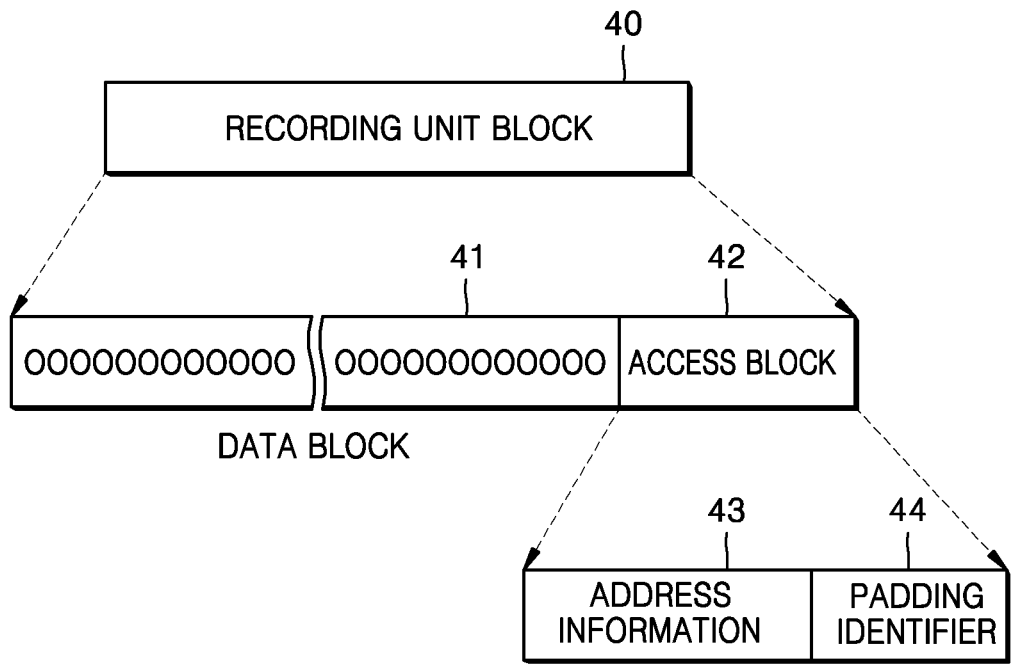
FIG. 4 illustrates a recording unit block to which a padding identifier is inserted during disc certification according to an embodiment of the present invention.

FIG. 4 illustrates a recording unit block 40 to which a padding identifier 44 is inserted during disc certification according to an embodiment of the present invention.

Referring to FIG. 4, the recording unit block 40, in which data is written when performing disc certification, includes a data block 41 in which invalid data is stored, and an access block 42 to access the data of the data block 41. In the example illustrated in FIG. 4, the invalid data that is stored in the data block 41 is illustrated as "00h," but the invalid data can also be "FFh" or another different value.

The access block 42 includes address information 43 of the data of the data block 41, and the padding identifier 44 to indicate that the data in the data block 41 is invalid. When a drive system accesses the recording unit block 40, the drive system learns that the data in the recording unit block 40 is invalid by first reading the access block 42 and checking the padding identifier 44.

Figure 5:
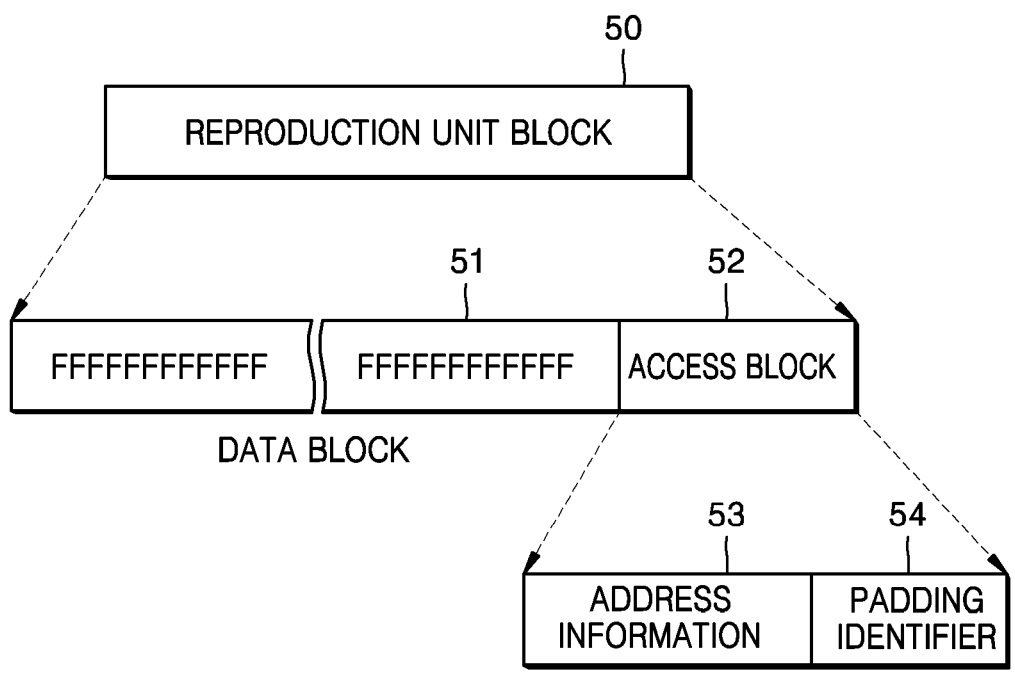
FIG. 5 illustrates a reproducing unit block to which a padding identifier is inserted during disc certification according to an embodiment of the present invention.

FIG. 5 illustrates a reproducing unit block 50 to which a padding identifier 54 is inserted during the disc certification according to an embodiment of the present invention.

Referring to FIG. 5, the reproducing unit block 50, in which data is written when performing the disc certification, includes a data block 51 in which invalid data is stored, and an access block 52 to access the data of the data block 51. In the example illustrated in FIG. 5, the invalid data that is stored in the data block 51 is illustrated as "FFh," But the invalid data can also be "00h" or another different value.

The access block 52 includes address information 53 of the data of the data block 51, and the padding identifier 54 to indicate that the data in the data block 51 is invalid. When the drive system accesses the reproducing unit block 50, the drive system learns that the data in the reproducing unit block 50 is invalid by first reading the access block 52 and checking the padding identifier 54.

An example in which a padding identifier is applied in a physical cluster comprising a long distance (LDS) cluster and a burst indicator subcode (BIS) cluster will now be described.

Figure 6:
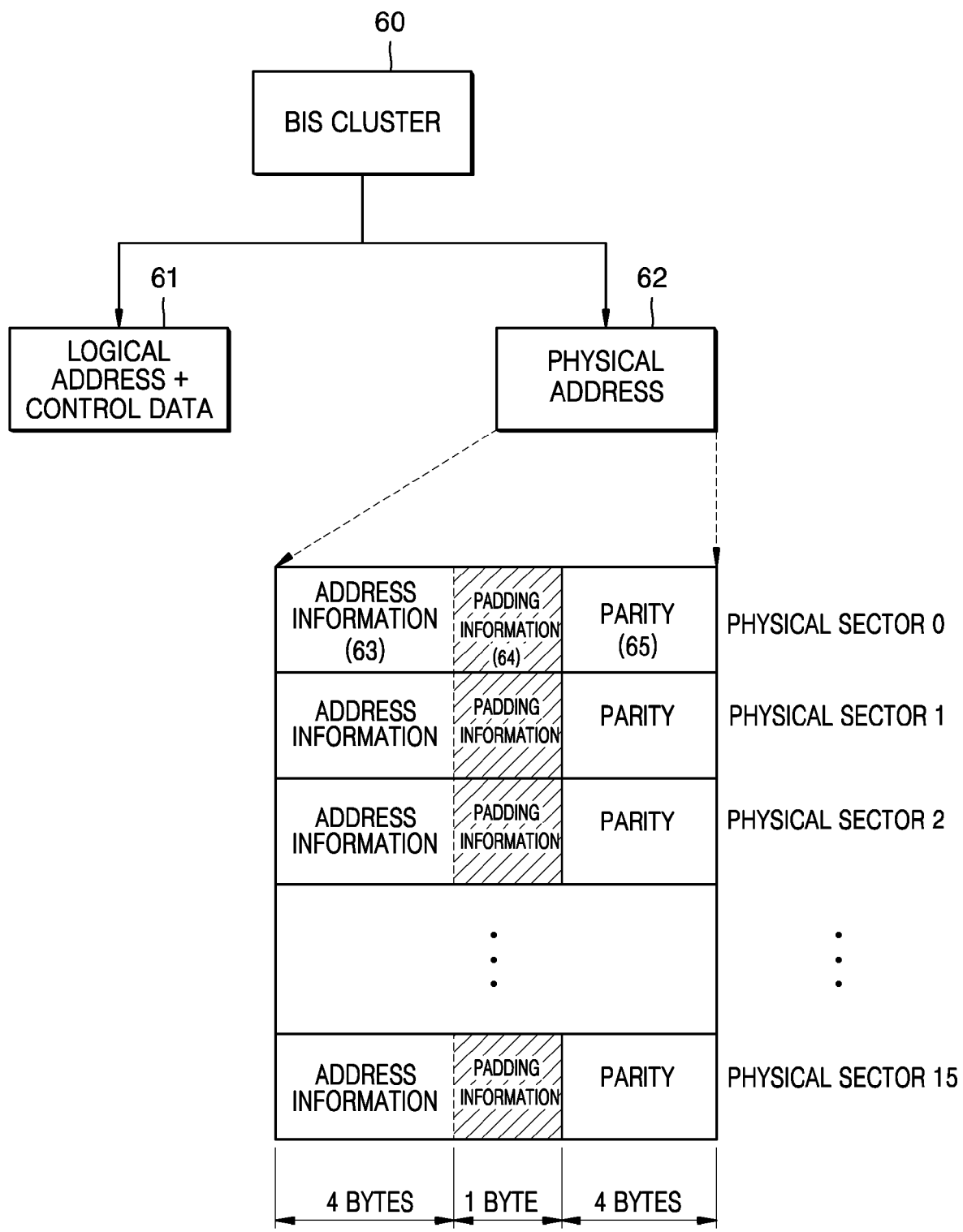
FIG. 6 is a reference diagram illustrating a structure of a burst indicator subcode (BIS) cluster having padding information inserted therein according to an embodiment of the present invention.

FIG. 6 is a reference diagram illustrating a structure of a BIS cluster 60 having padding information inserted therein according to an embodiment of the present invention.

The data structure illustrated in FIG. 6 is an example in which the padding identifier according to an embodiment of the present invention is applied to a data structure disclosed in the "interleaving encoding" technique. However, the data structure and system in which the padding identifier can be applied is sufficient if user data and the padding identifier, which are included in a recording unit block, are separately error correcting code (ECC) encoded, and padding information is error corrected before the user data is error corrected. The system and structure according to the "interleaving encoding" technique as illustrated in FIG. 6 is merely an example for the convenience of explaining the present invention.

Although not illustrated, invalid data is padded into a portion of, or the entirety of, user data that forms an ECC cluster for disc certification. The padding information, which is information on the invalid data, is inserted into a portion of a physical address 62 that forms the BIS cluster 60.

That is, referring to FIG. 6, the physical address 62 has address information regarding a total of 16 physical sectors, from physical sector 0 through 15. Information regarding each of the physical sectors is in 9 bytes. That is, the information regarding each of the physical sectors includes 4 bytes of address information 63, 1 byte of padding information 64, and 4 bytes of parity 65. That is, 16 physical sector numbers are stored in a cluster recorded on a disc within the BIS cluster 60, each of the physical sector numbers comprising 4 bytes of address information 63 and 1 dummy byte. When recording data on the disc, the data is encoded into a (9, 5, 5) code and stored within the BIS cluster 60.

The address information 63 indicates an address of a corresponding physical sector, the padding information 64 indicates that data in a corresponding physical sector is invalid, and the parity 65 indicates a parity value to error correct the address information 63 or the corresponding padding information 64.

The padding information 64 will be described in more detail with reference to FIGS. 7 and 8.

Figure 7:
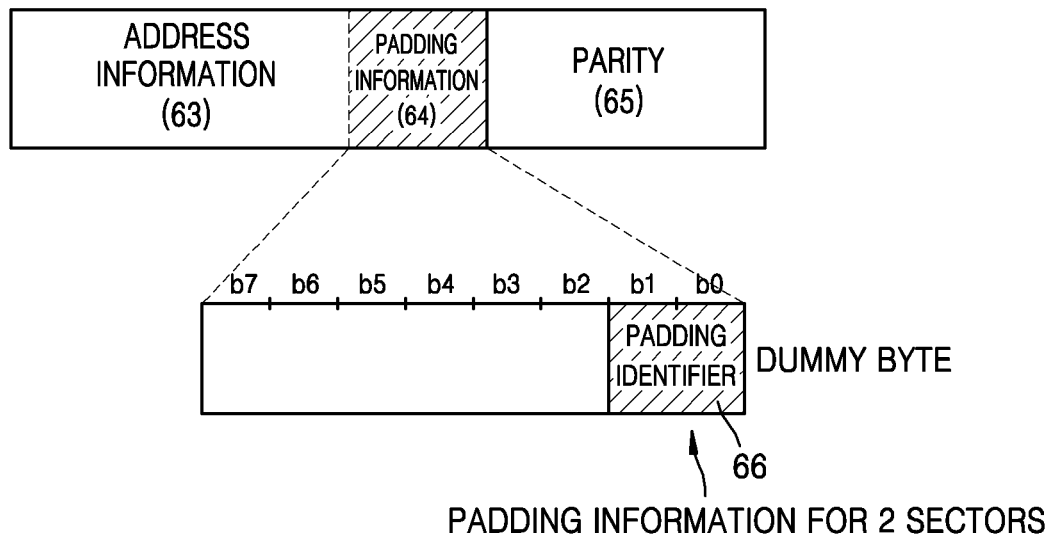
FIG. 7 is a structural diagram of a physical sector illustrated in FIG. 6 having padding information of two sectors in detail according to an embodiment of the present invention.

FIG. 7 is a structural diagram of one of the physical sectors 0 through 15 illustrated in FIG. 6, each having the padding information 64 for two sectors in detail according to an embodiment of the present invention.

Referring to FIG. 7, the 1 byte of padding information 64 is a dummy byte, and has a padding identifier 66 indicating the padding information 64 for two sectors using the lower 2 bits (b0 and b1) of the 8 bits of the dummy byte.

Within the BIS cluster 60, 16 physical sector numbers are stored in the cluster recorded on the disc. Each of the physical sector numbers comprises 4 bytes of address information 63 and 1 dummy byte, and, when recording data on the disc, the data is encoded into the (9, 5, 5) code and stored within the BIS cluster 60.

One LDS cluster is 32 sectors, which comprises 64 Kbytes. Therefore, 32 bits of padding information are required for each of the LDS clusters for disc certification. In this case, there are 16 physical sector numbers in one LDS cluster. So, if 2 bits are allocated to each dummy byte in the physical sector numbers, the padding information of each of the sectors of the entire LDS cluster, having 64 Kbytes and 32 sectors, can be indicated. That is, 2 bits within the dummy byte in one physical sector number indicates padding information of two sectors.

Figure 8:
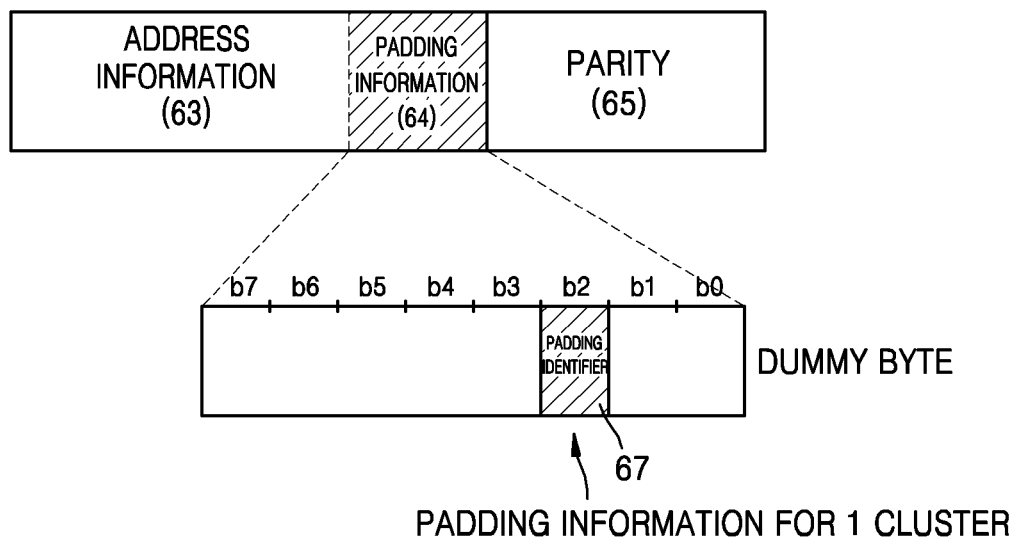
FIG. 8 is a structural diagram of a physical sector illustrated in FIG. 6 having padding information of a cluster in detail according to an embodiment of the present invention.

FIG. 8 is a structural diagram of one of the physical sectors 0 through 15 illustrated in FIG. 6 having the padding information 64 of a cluster in detail according to an embodiment of the present invention.

Referring to FIG. 8, the 1 byte of padding information 64 is a dummy byte, and has a padding identifier 67 indicating the padding information of one cluster using the third bit b2 from the bottom of the 8 bits of the dummy byte.

When indicating that the entire LDS cluster within the cluster is padded by the drive system by the disc certification, 1 bit for each instance of the padding information is sufficient. Therefore, as illustrated in FIG. 8, the padding information of the entire cluster can be indicated using a 1 bit padding identifier 67 within the dummy byte.

The padding information indicates that there is invalid information in each of the sectors within an ECC cluster or the entire cluster. As such, the drive system learns of the invalidity of data of sectors that are to be added or updated during the reading process of the read-modify-write process using the padding information 64 within the BIS cluster 60. Consequently, even if the LDS cluster in the ECC cluster cannot be error corrected, the adding or updating process of the cluster can be performed.

Figure 9:
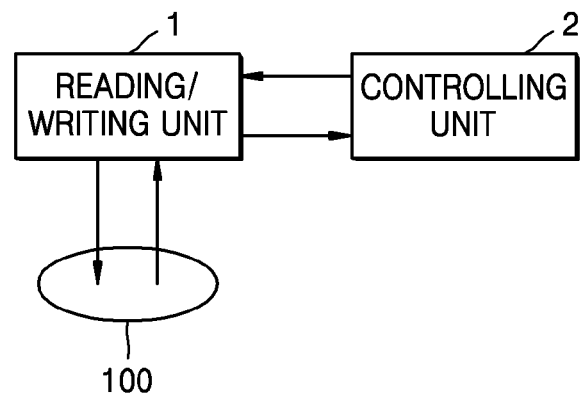
FIG. 9 is a schematic diagram of a recording/reproducing apparatus according to an embodiment of the present invention.

FIG. 9 is a schematic diagram of a recording/reproducing apparatus according to an embodiment of the present invention.

Referring to FIG. 9, the recording/reproducing apparatus, in which reading and/or writing of data is possible, includes a reading/writing unit 1 and a controlling unit 2. In other words, the recording/reproducing apparatus can read data, write data, or perform both reading and writing of data. The reading/writing unit 1 writes data on a disc 100, which is an information storage medium according to the present embodiment, and reads data to reproduce the recorded data. The controlling unit 2 controls the reading/writing unit 1 to write data in predetermined recording unit blocks, or obtains valid data by processing the data read by the reading/writing unit 1. Reproduction of the recorded data includes error correcting the read data and obtaining valid data, and is performed in predetermined units. The unit in which reproduction is performed, which is called a reproducing unit block, corresponds to the recording unit block. The reproducing unit block corresponds to at least one recording unit block.

When recording a small amount of data that does not fill the entire recording unit block on the disc 100, the controlling unit 2 makes a recording unit block have a predetermined size by storing valid data in a portion of the recording unit block and padding invalid data in the rest of the recording unit block, and then records the recording unit block on the disc

100. In particular, the controlling unit 2 includes a padding identifier, which indicates that data in a recording unit block is invalid, in the recording unit block when recording the recording unit block on the disc 100 for disk certification. The padding identifier according an embodiment of to the present invention may indicate invalid data by sectors or clusters. A detailed description related to this will be presented later.

When reproducing data from the disc 100, the reading/writing unit 1 reads the recording unit block having the padding identifier, and the controlling unit 2 determines that invalid data is included in the recording unit data based on the padding identifier in the recording unit block.

Figure 10:
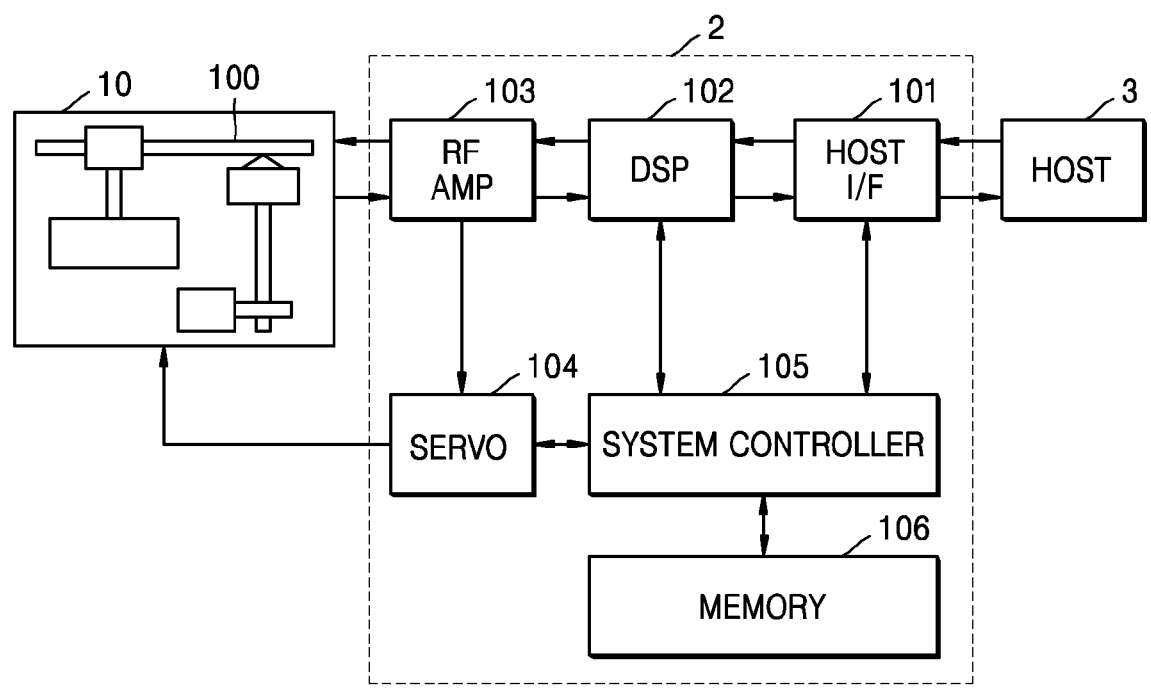
FIG. 10 is a detail diagram of the recording/reproducing apparatus of FIG. 9.

FIG. 10 is a diagram of the recording/reproducing apparatus of FIG. 9 configured in a disc drive system in detail.

Referring to FIG. 10, the disc drive system includes a pickup 10 as the reading/writing unit 1. The disc 100 is mounted on the pickup 10. Also, the disc drive system includes a host interface (I/F) 101, a digital signal processor (DSP) 102, a radio frequency amplifier (RF AMP) 103, a servo 104, a system controller 105, and a memory 106 as the controlling unit.

When recording data on the disc 100, the host I/F 101 receives a write command, together with data to be recorded, output from a host 3. The system controller 105 performs system initialization that is needed to write data on the disc 100. The DSP 102 adds additional data such as parity to error correct data that is to be written and which has been received from the host I/F 101, performs ECC encoding to generate an ECC block, which is an error-corrected block, and modulates the data in a predetermined method. Here, invalid data is used to fill a recording unit block, and a padding identifier that indicates invalid data in the recording unit block is added in the recording unit block to generate the ECC block when performing disc certification. The RF AMP 103 converts data output from the DSP 102 into an RF signal. The pickup 10 writes the RF signal output from the RF AMP 103 on the disc 100. The servo 40 receives a command needed for servo control from the system controller 105, and servo controls the pickup 10.

In particular, the system controller 105 generates the recording block filled with invalid data and a padding identifier that indicates the recording unit block is filled with the invalid data, and controls the pickup 10 to write the recording unit block on the disc 100 when recording the recording unit block filled with the invalid data on the disc 100 for disc certification.

In addition, after performing such a disc certification, the system controller 105 checks that the recording unit block is filled with invalid data through the padding identifier in the recording unit block, and makes data writable by the read-modify-write process even if error correction of the data in the recording unit block has failed when writing data on an address where the invalid data is written on the disc 100. Also, when recording data on the disc 100, a writing operation is immediately performed without having to read a recording block from the disc 100 when the block is registered as a defect list as the result of disc certification. Description related to this will be described in more detail later.

When reading data from the disc 100, the host I/F 101 receives a read command output from the host 3. The system controller 105 performs initialization needed for reading the data. The pickup 10 emits a laser beam onto the disc 10, and outputs an optical signal obtained by receiving a laser beam reflected from the disc 100. The RF AMP 103 converts the optical signal output from the pickup 10 into an RF signal and provides modulated data obtained from the RF signal to the DSP 102 in addition to providing a servo signal to the servo 104 to control the pickup 10. The DSP 102 demodulates the modulated data and outputs data obtained after ECC error correction. The servo 104 receives a servo signal output from the RF AMP 103, and a command needed for servo control output from the system controller 105, and servo controls the pickup 10. The host I/F 101 transmits the data received from the DSP 102 to the host 3. In particular, the system controller 105 can determine that invalid data is included in a recording unit block when a padding identifier included in the recording unit block is detected by error correction of the recording unit block.

The following is a description of the disc certification process performed by the recording/reproducing apparatus.

When a re-writable disc is inserted into the disc drive system and is determined to be a blank disc, the system controller 105 of the disc drive system performs disc initialization to use the disc according to a command output from the host 3 or the intention of a drive manufacturer. When desiring to determine a defect status of each of the clusters in a recordable area which includes a data area of the disc in the process of disc initialization, the system controller 105 reproduces the clusters after writing in a specific value such as 00h or FFh in each of the clusters in the recordable area, and performs error correction to perform disc certification that determines whether there is a defect in each of the clusters. Also, the system controller 105 can perform quick certification when wanting to redetermine the defect status of each of the clusters in the recordable area which include the data area of the disc, or determine a defect status of each of the clusters in some specific areas when re-initializing the re-writable disc that is currently in use, according to a command output from the host 3.

Figure 11:
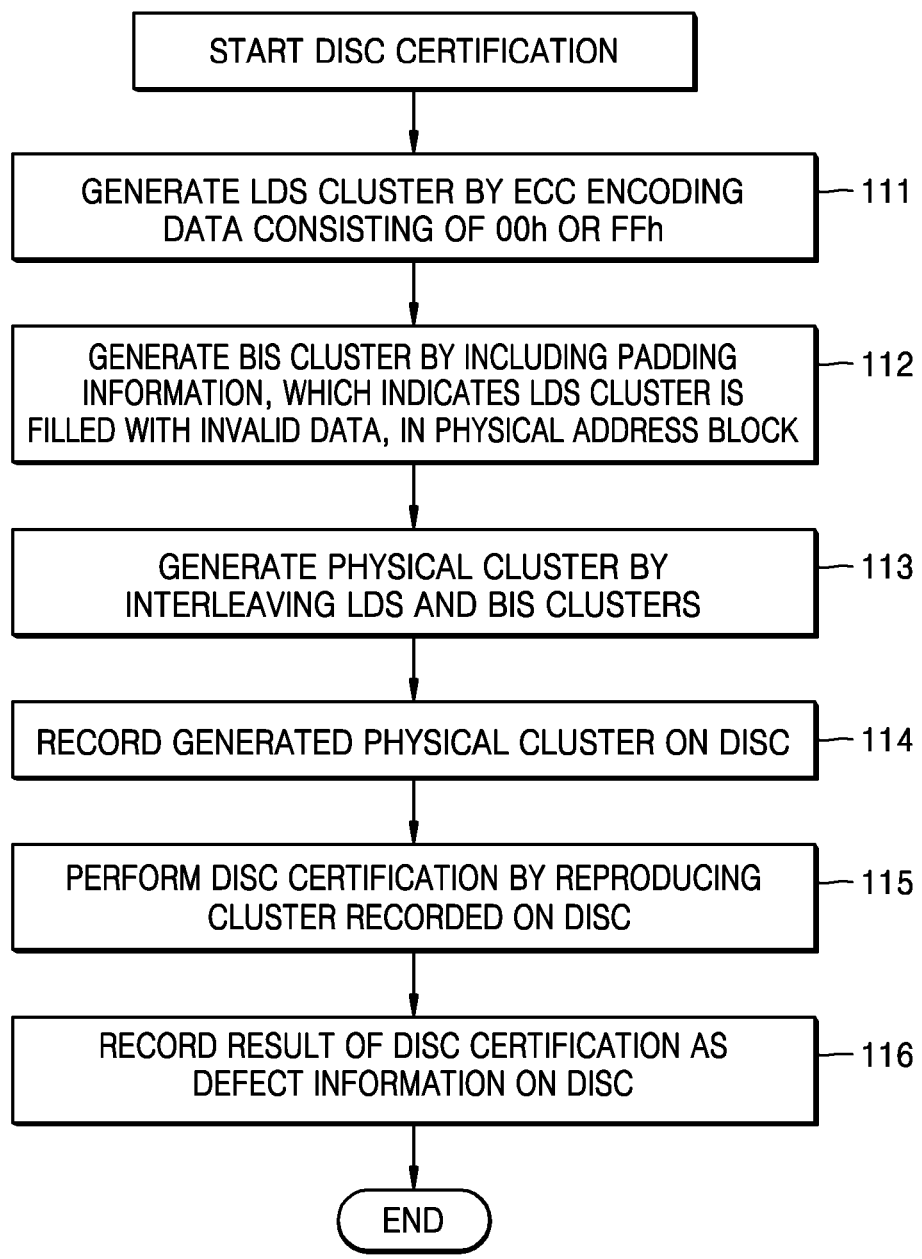
FIG. 11 is a flow chart illustrating a method of performing disc certification according to an embodiment of the present invention.

FIG. 11 is a flow chart illustrating a method of performing disc certification according to an embodiment of the present invention.

First, the system controller 105 of the disc drive system ECC encodes 64 Kbytes of data comprising 00h or FFh for disc certification, and generates an LDS cluster (111).

Then, the system controller 105 ECC encodes the LDS cluster by including a physical sector number of the LDS cluster and other additional information, and generates a BIS cluster (112). Here, the BIS cluster is generated by including padding information that indicates each sector (2 Kbytes) of the 64 Kbytes LDS cluster, or the entire 64 Kbytes LDS cluster, is filled with invalid data in a physical address block.

Afterwards, the system controller 105 interleaves the LDS cluster and the BIS cluster and generates an ECC physical cluster (113), and generates a recording unit block by going through processes needed for recording, such as inserting a sync pattern, and records the recording unit block in the disc 100 (114).

Next, the system controller 105 reproduces the cluster recorded on the recording medium and performs disc certification (115).

Then, the system controller 105 records defect information of the cluster having a defect according to the result of the disc certification on the recording medium (116).

When the host 3 tries to record data on the certified cluster after certification has been performed on a portion of a recordable area of the disc or the entire disc, the disc drive system will find a physical sector number (PSN) corresponding to a logical sector number (LSN) generated by a write command of the host 3 and performs recording. The following read-modify-write process is performed by the drive system 105 if the size of the LSN generated by the write command is not a multiple of the cluster (64 Kbytes=32 sectors), since clusters on the disc 100 on which some of the sectors in the beginning or end are to be recoded are already recorded in (the disc drive system cannot know whether valid data is recorded in the cluster recorded on the disc 100 until the BIS cluster is reproduced and the padding information is obtained).

Figure 12:
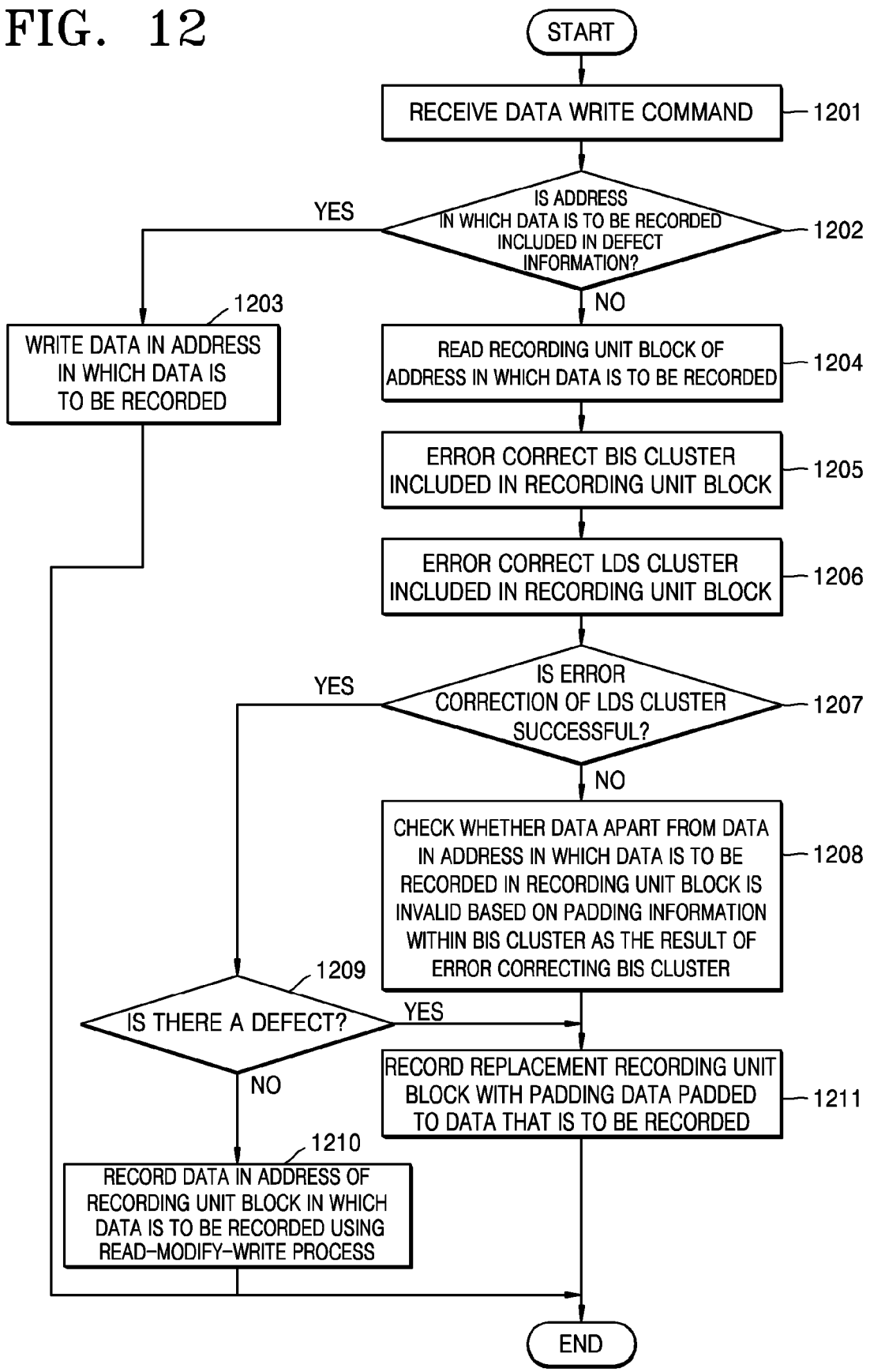
FIG. 12 is a flow chart illustrating a method of writing data in a recording unit block after disc certification according to an embodiment of the present invention.

FIG. 12 is a flow chart illustrating a method of writing data on a recording unit block after the disc certification according to an embodiment of the present invention.

Referring to FIG. 12, the disc drive system receives a data write command from the host 3 or an application (1201). The host 3 or the application transmits the data write command along with a logical address of the data that is to be recorded on the disc 100.

The system controller 105 first finds a physical address that corresponds to the logical address of the data that is to be recorded, and which has been transmitted together with the write command, and then determines whether the physical address is an address included in the defect information (1202).

The data that is to be recorded is immediately written on the disc 100 when an address to which data is to be recorded in is included in the defect information (1203). That is, if the address is registered as the defect information as the result of the disc certification, a cluster in the address has a defect or has a possibility of having a defect. This means that valid data is not recorded in the address. Thus, data can be recorded at the address without having to reproduce the cluster by the read-modify-write process and error correct the cluster. Even if a problem can later occur when reproducing the cluster in the address from the disc 100 because the cluster has a defect or has a possibility of having a defect, there is also a possibility that the data can be properly read by another disc drive system. Therefore, the data is recorded at the address that is to be recorded in at the present time.

If an address at which the data is to be recorded is not included in the defect information, a recording unit block is read from a physical address corresponding to the address in the disc 100 and the recording unit block is stored in a memory (1204). Here, the disc drive system reads one recording unit block for the data that is to be recorded even if the amount of the data is less than the one recording unit block. For example, assuming one recording unit block has 32 sectors, the disc drive system reads 32 sectors of the recording unit block for 16 sectors of the data that are to be recorded from the disc 100, even when the amount of data that is to be recorded is only 16 sectors.

Next, the system controller 105 controls the DSP 102 to error correct a BIS cluster of the recording unit block stored in the memory (1205). The system controller 105 obtains padding information of each sector of an LDS cluster or the entire LDS cluster within the BIS cluster by error correcting the BIS cluster.

When error correcting of the BIS cluster is completed, the system controller 105 controls the DSP 102 to error correct the LDS cluster of the recording unit block (1206).

Next, the system controller 105 determines whether error correcting of the LDS cluster is successful (1207), and the recording unit block is processed in a general method when the error correcting of the LDS cluster is successful.

That is, it is determined whether there is a defect in the recording unit block (1209). Actually, whether to process the recording unit block as a defect can be determined from error correcting in operation 1205. If the recording unit block is determined not to have a defect as the result of the determination, data is renewed at the location it is to be recorded on the recording unit block, which is stored in the memory, and the recording unit block in which the data is recorded is recorded on the disc 100 (1210). This is the general read-modify-write process.

If the recording unit block is determined to have a defect as the result of the determination in operation 1207, data is recorded on the location that is to be recorded in the recording unit block, which is stored in the memory, and the recording unit block with the data recorded therein is recorded on a replacement location of the disc 100 (1211).

When the error correcting of the LDS cluster is unsuccessful in operation 1207, the system controller 105 checks whether data apart from the data at the address at which the data is to be recorded in the recording unit block is invalid based on padding information within the BIS cluster as the result of error correcting the BIS cluster (1208). That is, the padding information, which is information on the padding data, is further included in the recording unit block when the entire recording unit block is not filled with valid data but only a part the recording unit block is filled with valid data and the rest is filled with invalid padding data to create one recording unit block according to an embodiment of the present invention. In addition, the system controller 105 can check the location of valid data and invalid data in the recording unit block from the padding information if the BIS cluster is error corrected by including the padding information in the BIS cluster according to an embodiment of the present invention.

In this case, if it is confirmed that the data besides the data at the address at which the data is to be recorded in the recording unit block is invalid padding data, the control system 105 can record the data on the recording unit block even if error correcting of the LDS cluster has failed. This is because the data at the address at which the data is to be recorded in the recording unit block will be overwritten, and thus it does not matter whether it is error corrected. Also, if the data besides the data at the address at which the data is to be recorded in the recording unit block is invalid padding data, it does not need to be error corrected.

Therefore, in this case, the system controller 105 arranges the data at the location at which data is to be recorded in the recording unit block, which is stored in the memory, and pads the invalid padding data in a location beside the location at which the data is to be recorded (i.e., the rest of the recording unit block) to create a replacement recording unit block. Then, the replacement recording unit block is recorded on a replacement location of the disc 100 (1211). That is, the disc drive system makes the recording unit block into a full 64 Kbytes comprising the data according to the write command of the host 3 and the padding data, and then records the recording unit block on the disc 100. Likewise, the data padded by the system controller 105 indicates padding information for each sector within the BIS cluster.

Figure 13:
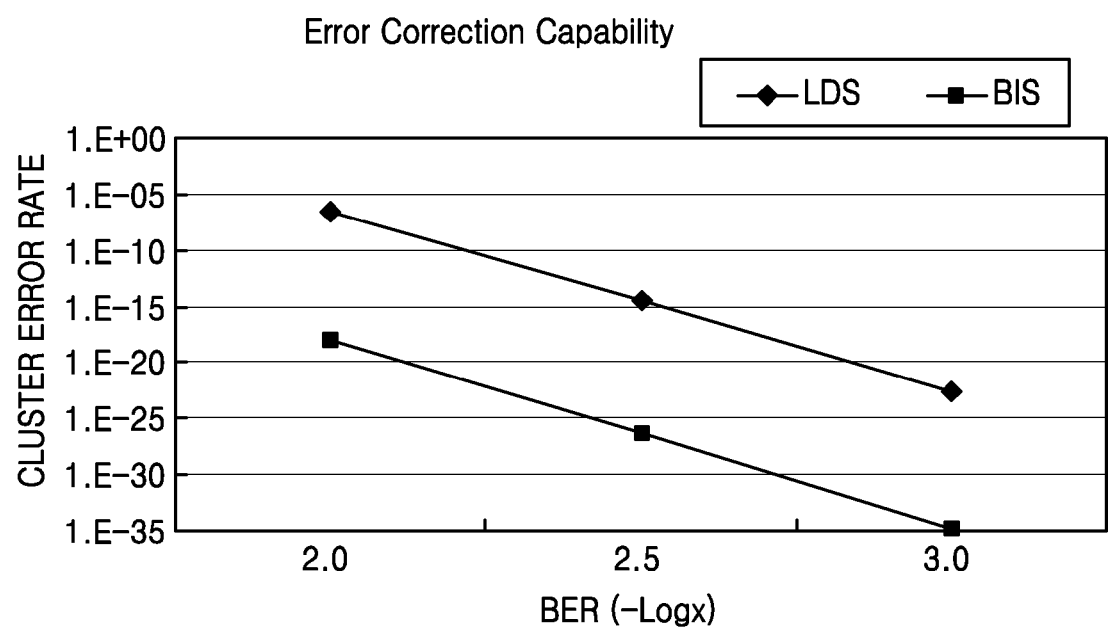
FIG. 13 is a graph comparing error correction capability of a long distance (LDS) cluster and a BIS cluster.

FIG. 13 is a graph comparing error correction capability of an LDS cluster and a BIS cluster.

Referring to FIG. 13, the error correction ability of the BIS cluster and the LDS cluster caused by a random error are compared. It can be seen from the graph that the error correction capability of the BIS cluster is much better than the error correction capability of the LDS cluster. The difference in error correction ability of the LDS cluster and the BIS cluster caused by the random error occurs as illustrated in FIG. 13 because the LDS cluster comprises (248, 216, 33) code, while the BIS cluster comprises (62, 30, 22) code. As such, parity byte numbers of the LDS cluster and the BIS cluster are the same, but the length of the code of the BIS cluster is much shorter than that of the LDS cluster. As a result, the difference in error correcting ability of the BIS cluster and the LDS cluster is as illustrated in FIG. 13.

The difference in error correction capability of the BIS cluster and the LDS cluster caused by a burst error is as follows. Each of the codewords of the LDS cluster has 32 parity bytes. Thus, a maximum of 32 bytes in each of the codewords is error corrected through the interleaving method and eraser correction using the BIS byte. Eraser correction is used to improve error correction performance regarding Reed-Solomon code. For example, if error correction of an inner codeword fails, an eraser flag is set to the codeword and an outer codeword is error corrected using the flag. Whereas error correction is performed regarding an error in which a "position" and "value" cannot be identified, eraser correction is performed regarding an error in which a "position" is identified and a "value" is not identified. Therefore, the LDS cluster can be corrected up to 64 recording frames within the recording unit block. On the other hand, although the BIS cluster has the same parity byte number for each codeword as that of the LDS codewords, only up to 16 error bytes within each of the BIS codewords can be corrected because eraser correction is not performed. However, a maximum of 128 recording frames can be corrected within the recording unit block since the BIS cluster comprises 24 codewords, the codewords being interleaved evenly within the BIS cluster. For example, while in the LDS cluster, errors caused by a long error such as a maximum of 1 cm scratch in the LDS cluster can be corrected, in the BIS cluster, longer errors that are double the length of the error in the LDS cluster, such as a maximum of 2 cm scratch, in the BIS cluster can be corrected.

The case in which the BIS cluster can be error corrected, but the LDS cluster cannot be error corrected, occurs frequently. Thus, padding information for each of the sectors is included in the BIS cluster, and data is added to the padding information or updated even if the LDS cluster has a defect when reading the LDS cluster during the read-modify-write process. Therefore, unnecessary retrying of the disc drive system is prevented, thereby improving the efficiency of the disc drive system.

According to the present invention as described above, an efficiency of a drive system can be improved by preventing a redundant retrying process of the drive system by checking information on invalid data included in a recording unit block, which is recorded during disc certification, in advance and writing data on a disc. Also, by not reporting a data write operation that can actually be processed as an error, error correction capability can be consequently improved.

The method of recording/reproducing as described above can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily written by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical recording medium on which a recording/reproducing unit block is recorded, the recording/reproducing unit block comprising:
   an indicator to indicate that invalid data is included in the recording/reproducing unit block, the invalid data being added during disc certification,
   wherein the recording/reproducing unit block is a physical cluster comprising a first cluster and a second cluster,
   the first cluster comprises a plurality of sectors, each sector being used to store user data, and
   the second cluster comprises location information on the plurality of sectors included in the first cluster and information indicating whether the invalid data is stored in the each sector.

2. The optical recording medium of claim 1, wherein the indicator comprises a single bit in the recording/reproducing unit block.

3. The optical recording medium of claim 1, wherein the indicator comprises two bits in the recording/reproducing unit block, and indicates invalid data information regarding two sectors of the recording/reproducing unit block.

4. The optical recording medium of claim 1, wherein the indicator indicates invalid data information regarding an entire cluster of the recording/reproducing unit block.

5. The optical recording medium of claim 1, wherein the indicator is provided in an access block of the recording/reproducing unit block.

6. The optical recording medium of claim 1, wherein the indicator is provided in a dummy byte in the recording/reproducing unit block.

7. A method of disc certification of a recording medium, the method comprising:
   filling a recording unit block with invalid data; and
   adding an indicator to the recording unit block to indicate that the recording unit block includes the invalid data,
   wherein the recording unit block a physical cluster comprising a first cluster and a second cluster,
   the first cluster comprises a plurality of sectors, each sector being used to store user data, and
   the second cluster comprises location information on the plurality of sectors included in the first cluster and information indicating whether the invalid data is stored in the each sector.

* * * * *